(12) United States Patent
Shirahama et al.

(10) Patent No.: US 6,219,104 B1
(45) Date of Patent: Apr. 17, 2001

(54) PICTURE PROCESSING APPARATUS AND PROCESSING METHOD

(75) Inventors: Akira Shirahama; Shinichiro Miyazaki, both of Kanagawa; Takeshi Ono, Saitama; Nobuo Ueki, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/989,586

(22) Filed: Dec. 12, 1997

(30) Foreign Application Priority Data

Dec. 24, 1996 (JP) .................................... 8-343614

(51) Int. Cl.$^7$ ............................. H04N 7/01; H04N 5/44; H04N 9/74

(52) U.S. Cl. .......................... 348/458; 348/441; 348/445; 348/448; 348/458; 348/561; 348/581; 348/582; 345/127; 345/131; 345/439; 345/479

(58) Field of Search .................................. 348/441, 445, 348/448, 458, 581, 582, 561; 345/127, 131, 439, 475

(56) References Cited

U.S. PATENT DOCUMENTS

| | | | |
|---|---|---|---|
| 4,587,556 | 5/1986 | Collins | 358/140 |
| 4,951,125 | 8/1990 | Kojima et al. | 358/22 |
| 5,438,361 | * 8/1995 | Coleman | 348/208 |
| 5,521,636 | * 5/1996 | Nakayama et al. | 348/222 |
| 5,530,482 | * 6/1996 | Gove et al. | 348/441 |
| 5,621,469 | * 4/1997 | Monta et al. | 348/445 |
| 5,719,594 | * 2/1998 | Potu | 345/120 |
| 5,933,196 | * 8/1999 | Hatano et al. | 348/441 |

FOREIGN PATENT DOCUMENTS

| | | |
|---|---|---|
| 0 477 884 | 4/1992 | (EP) . |
| 0 811 950 | 12/1997 | (EP) . |
| 2 059 712 | 4/1981 | (GB) . |

OTHER PUBLICATIONS

Kinuhata, K.: "A digital standards-converter for television using intra-frame line interpolation techniques" IEEE International Conference on Communications, Jun. 17–19, 1974, pp. 7c–1–7c–5, XP002100805.

Kuruma T., Yoshida J.: "Digital fields store television standards converter" International Broadcasting Convention, London, UK, IEE, Sep. 23–27, 1974, pp. 104–113, XP002101166.

* cited by examiner

*Primary Examiner*—John Peng
*Assistant Examiner*—Brian P. Yenke
(74) *Attorney, Agent, or Firm*—Frommer Lawrence & Haug, LLP.; William S. Frommer; Darren Michael Simon

(57) ABSTRACT

An interpolation interval $V_{dp}$ obtained by the picture sizes of the original picture and the converted picture is cumulated by an adder. In the odd field, a selector selects [0.5] as an offset corresponding to an odd/even field determination signal. In the even field, the selector selects [0] as an offset corresponding to the odd/even field determination signal. In a vertical blanking interval, the offset is selected as an output. Thus, in the odd field, the offset value [0.5] is added to the cumulated value of $V_{dp}$. Thereafter, $V_{dp}$ is cumulated again. Corresponding to the cumulated value, a line read address n and linear interpolating coefficients $q_{n1}$ and $q_{n2}$ are obtained. When $V_{dp}$ is cumulated, offsets corresponding to the scanning start points in the odd field and the even field are added. Thus, the interlace accuracy is kept.

7 Claims, 8 Drawing Sheets

Fig. 1
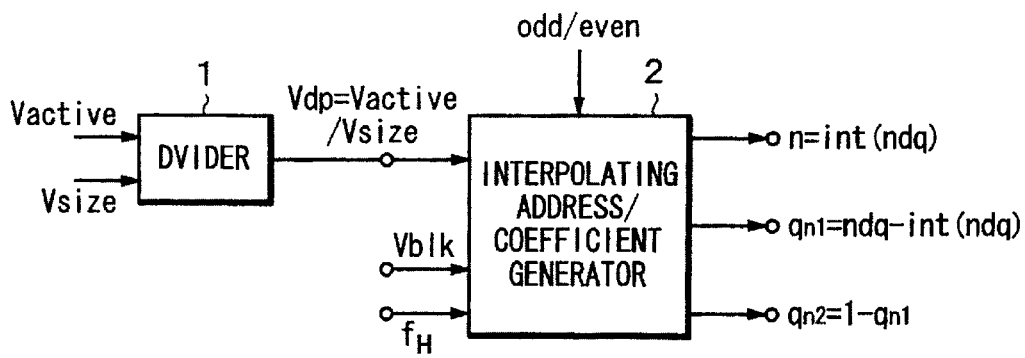
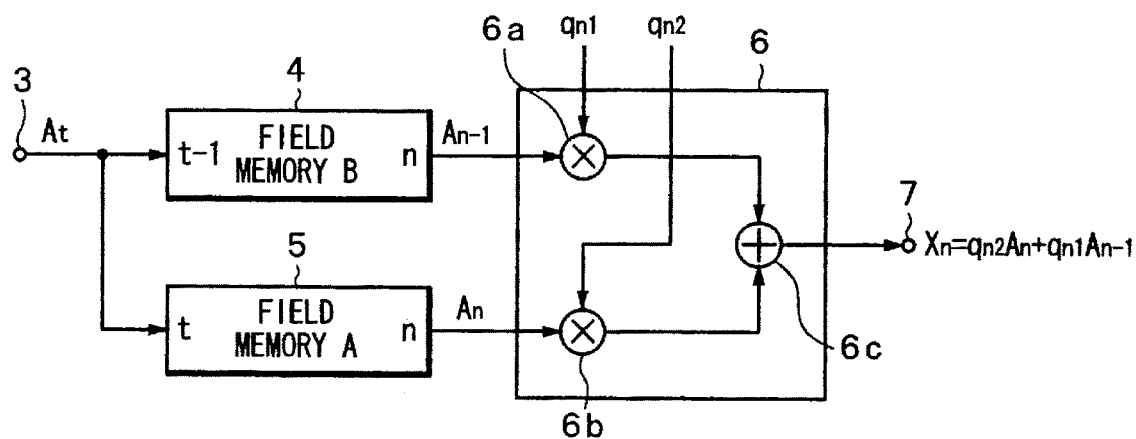
Fig. 2
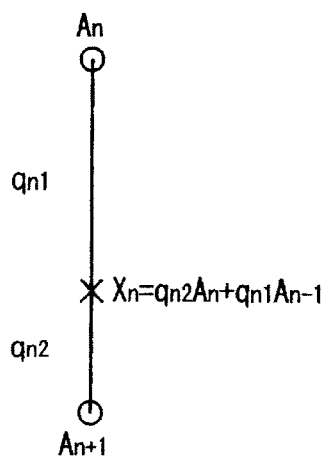

Fig. 3A

| | |
|---|---|
| 1 | A1 |
| 2 | A2 |
| ⋮ | ⋮ |
| n−1 | An−1 |
| n | An |
| ⋮ | ⋮ |
| N−1 | AN−1 |

Fig. 3B

| | |
|---|---|
| 1 | A2 |
| 2 | A3 |
| ⋮ | ⋮ |
| n−1 | An |
| n | An+1 |
| ⋮ | ⋮ |
| N−1 | AN |

×  ×  O  ×  ×  ODD
×  O  O  ×  ×  EVEN

⇑

↑↑↑↑↑↑↑↑ INTERPOLATION POSITION (bottom)
↓↓↓↓↓↓↓↓ INTERPOLATION POSITION (top)

ODD EVEN

⇑

× × ⊘ O ⊘ × × ODD
× ⊘ O O O ⊘ × × × EVEN

Fig. 6A
× × O × ×
× O O × ×
ODD EVEN
Fig. 6B
↓↓↓↓↓↓↓↓↓ INTERPOLATION POSITION
| × | O | O | × | × |
| × | × | O | × | × |
↑↑↑↑↑↑↑↑↑ INTERPOLATION POSITION
ODD EVEN
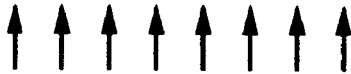
Fig. 6C
× ● O ● × ×
× ⊘ O ⊘ × × ×
ODD EVEN

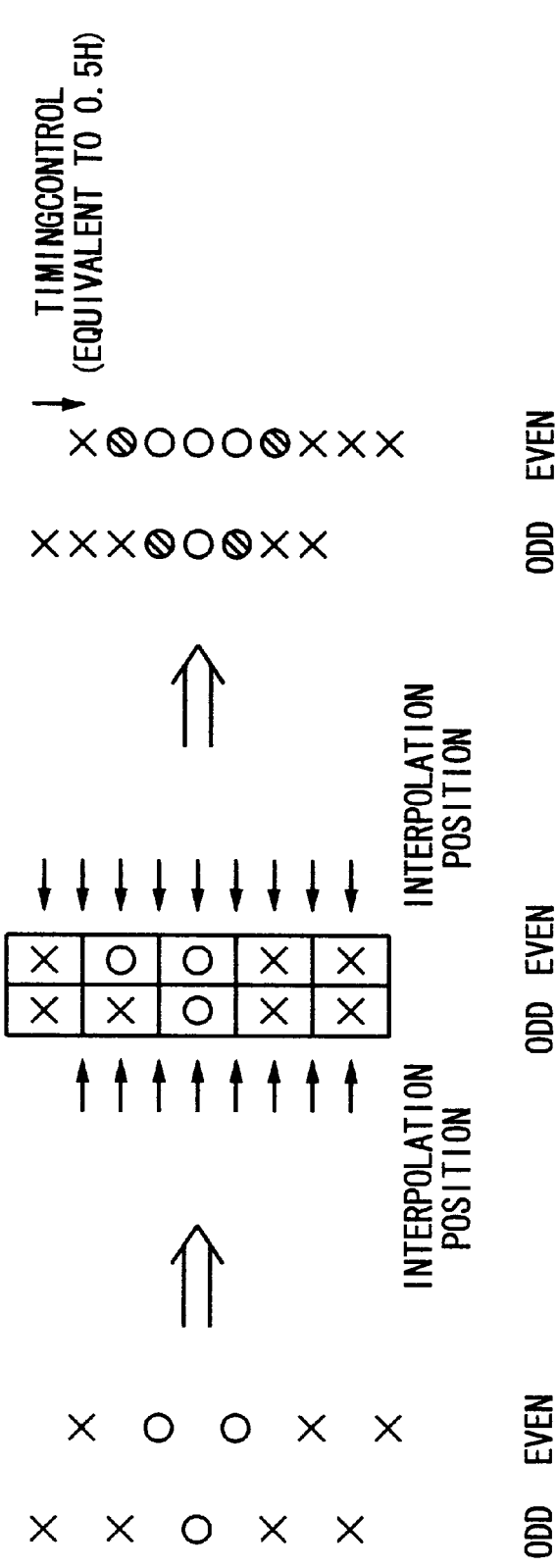

Fig. 8A

```
X    X
X    X
O    O
O    O
O    O
X    X
X    X
X    X
     X
```
ODD  EVEN

Fig. 8B

```
X    X
X    X
X    X
O    O
O    O
X    O
X    O
X    X
X    X
     X
```
ODD  EVEN

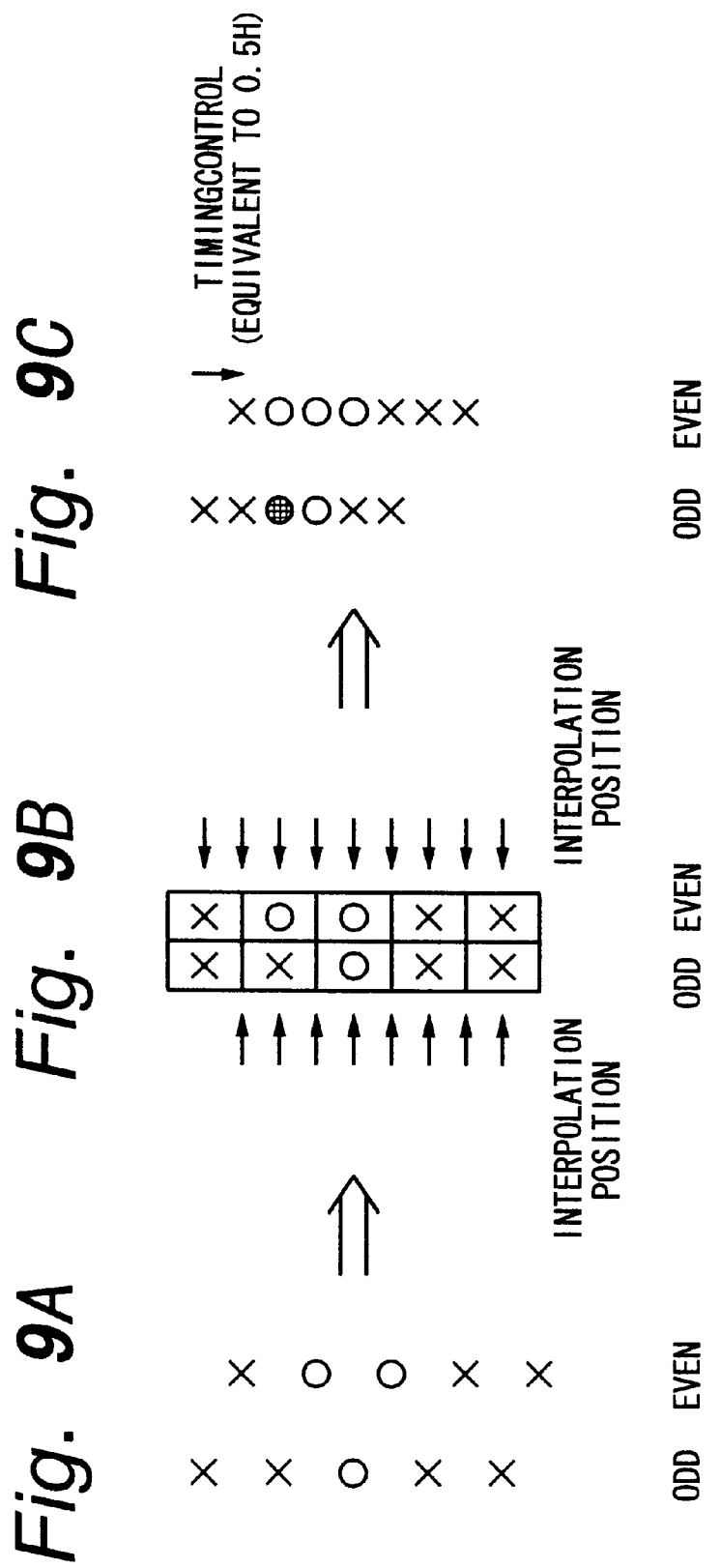

PICTURE PROCESSING APPARATUS AND PROCESSING METHOD

BACKGROUND OF THE INVENTION

1. Field of the Invention

The present invention relates to a picture processing apparatus and a processing method thereof for performing an interpolating process in such a manner that the interlace relation of an original picture is kept in performing a line number converting process with a field memory for accessing an interlace signal for each line.

2. Description of the Related Art

Normally, a video signal is sent and processed in an interlace system. As is known, in a video signal corresponding to the interlace system, one frame is composed of two fields that are an odd field and an even field. Lines that are skipped in the odd field are scanned in the even field. In this case, the scanning start position of the odd field is different from the scanning start position of the even field by 0.5 H (horizontal frequency) as timing difference. The timing difference keeps the interlace relation.

On the other hand, there are needs for enlargement and reduction of pictures. A picture is enlarged or reduced by a line number converting process for a video signal. The line number converting process is performed by writing a video signal to the field memory line by line (every 1 H). Since the video signal is written line by line, the odd field and the even field are written to the field memory in the same manner. In other words, a particular line of each of the odd field and even field is written to the same address of the field memory. Thus, the deviation of the scanning start position by 0.5 H does not take place. Consequently, in the space of the field memory, the above-described interlace relation does not become kept.

Thus, when the picture enlarging process for increasing the number of lines in the fields is performed by reading data from the field memory, the resultant resolution adversely deteriorates. This is because when the number of lines is converted by linearly interpolating adjacent two lines in the field, the variation of the relation of lines in each field adversely affects the interpolating process. However, when the picture reducing process for decreasing the number of lines in the fields is performed, such a problem does not take place.

Thus, conventionally, when a line is read from the field memory, the read timing between the fields is varied for the interlace time period (namely, 0.5 H). Thus, the problem of the deterioration of the resolution in the enlarging process was solved. This method is effective when the number of lines is increased an integer number of times (for example, two times).

FIGS. 7A to 7C show examples of which lines are read at different read timings that vary for 0.5 H and linearly interpolated so as to increase the number of lines two times. Pixels in FIGS. 7A to 7C show representative points of which the horizontal positions on individual lines are the same. This representation applies to other drawings that follow. "○" represents a pixel in white level. "X" represents a pixel in black level. Pixels on lines of the odd field and even field are interlaced. "●" represents a dirk gray whose brightness is 50% or less. Hatched "○" represents a bright gray whose brightness is 50% or more. In FIGS. 7A to 7C, the top odd line is for example the firs line.

An original signal shown in FIG. 7A is written to the field memory in such a manner that the original signal in the odd field is treated in the same manner as the original signal in the even field as shown in FIG. 7B. When the number of lines is converted and increased two times, the interpolating process is performed at positions denoted by arrows corresponding to these pixels as shown in FIG. 7B. The interpolating process is performed every ½ lines in each field. When an original signal is read, timing for 0.5 H is controlled. Thus, pixels as shown in FIG. 7C are obtained. A pixel that is interpolated with a pixel of white level and a pixel of black level becomes a gray pixel. Thus, in the converting process for increasing the number of lines two times, the interpolating process can be properly performed in the conventional method.

In the converting process for increasing the number of lines two times, there are several methods. As a first method, one frame image which the odd field and the even field are overlaid is displayed in succession over two fields without an in-field interpolating process. As a second method, each field is read twice so as to increase the number of lines. However, in these methods, in the first method, as shown in FIG. 8A, since pictures that have a delay each other are displayed on the same screen, the motion thereof becomes unnatural. In the second method, as shown in FIG. 8B, the sufficient resolution deteriorates. Thus, it cannot be said that such methods are good.

On the other hand, there are needs for a variable enlarging process rather than a fixed enlarging process (for example, the enlargement ratio is not an integer value such as 4/3 times the original picture). In this case, the optimum interlace relation cannot be maintained. Thus, the resolution will deteriorate or lines will flicker. Consequently, the picture quality of the resultant picture becomes poor.

FIGS. 9A to 9C show examples of the result of a conventional interpolating process in the case that an enlarging process for 4/3 times was performed. As shown in FIG. 9B, the interlace relation of the odd field and even field is lost in an original pixel signal (FIG. 9A) written to a field memory. The resultant signal is written to the field memory. When the number of lines is converted and increased 4/3 times, the interpolating process is performed at the positions denoted by arrows shown in FIG. 9B. In other words, the interpolating process is performed every 1/(4/3) lines in each field (namely, every ¾ lines). When data is read, timing for 0.5 H is controlled. Thus, pixels as shown in FIG. 9C are obtained. Consequently, since the symmetrical shape of the original pixel signal becomes asymmetrical, the resultant signal is observed as lines that flicker.

Thus, in the conventional method, when data is written to the field memory, the interlace relation is not kept. Consequently, when a picture is enlarged with an enlargement ratio of a non-integer value (such as 4/3 times), the resultant picture gets distorted against the original picture.

OBJECTS AND SUMMARY OF THE INVENTION

Therefore, an object of the present invention is to provide a picture processing apparatus and a processing method thereof that allow the result of an interpolating process to be obtained with the interlace relation of the original picture even if the magnification factor is not an integer value in a line number converting process with a field memory for accessing an interlace signal line by line.

To solve the above-described problem, the present invention is a picture processing apparatus for interpolating a video signal that has been interlaced, comprising a memory means for storing the video signal, reading means for reading signals corresponding to two adjacent scanning lines of the same field from the memory means at the same time, interpolating means for interpolating the two signals read from the memory means, wherein the reading means changes a read start address of the memory means depending on whether signals of the odd field or the even field are read.

In addition, the present invention is a picture processing method for interpolating a video signal that has been interlaced, comprising the steps of storing the video signal to a memory, changing a read start address depending on whether signals of the odd field or the even field are read from the memory and reading signals corresponding to two adjacent scanning lines of the same field at the same time, and interpolating means for interpolating the two signals that have been read.

As described above, according to the present invention, since an interpolating process is performed for a line number converting process corresponding to an interpolation interval initialized and cumulated for each field with a value corresponding to the scanning start point of each of the odd field and even field, the interlace relation is kept in the result of the interpolating process.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a block diagram showing an example of the structure of a picture processing apparatus according to the present invention;

FIG. 2 is a schematic diagram for explaining a liner interpolating process;

FIGS. 3A and 3B are schematic diagrams showing an example of mapping of a field memory;

FIGS. 6A to 6C are schematic diagrams for explaining a conversion for increasing the number of lines 4/3 times;

FIGS. 7A to 7C are schematic diagrams for explaining a conventional conversion for increasing the number of lines two times;

FIGS. 8A and 8B are schematic diagrams for explaining a frame overlaying process and a twice reading process; and FIGS. 9A to 9C are schematic diagrams for explaining a conventional conversion for increasing the number of lines 4/3 times.

DETAILED DESCRIPTION OF THE PREFERRED EMBODIMENTS

Figure 4:
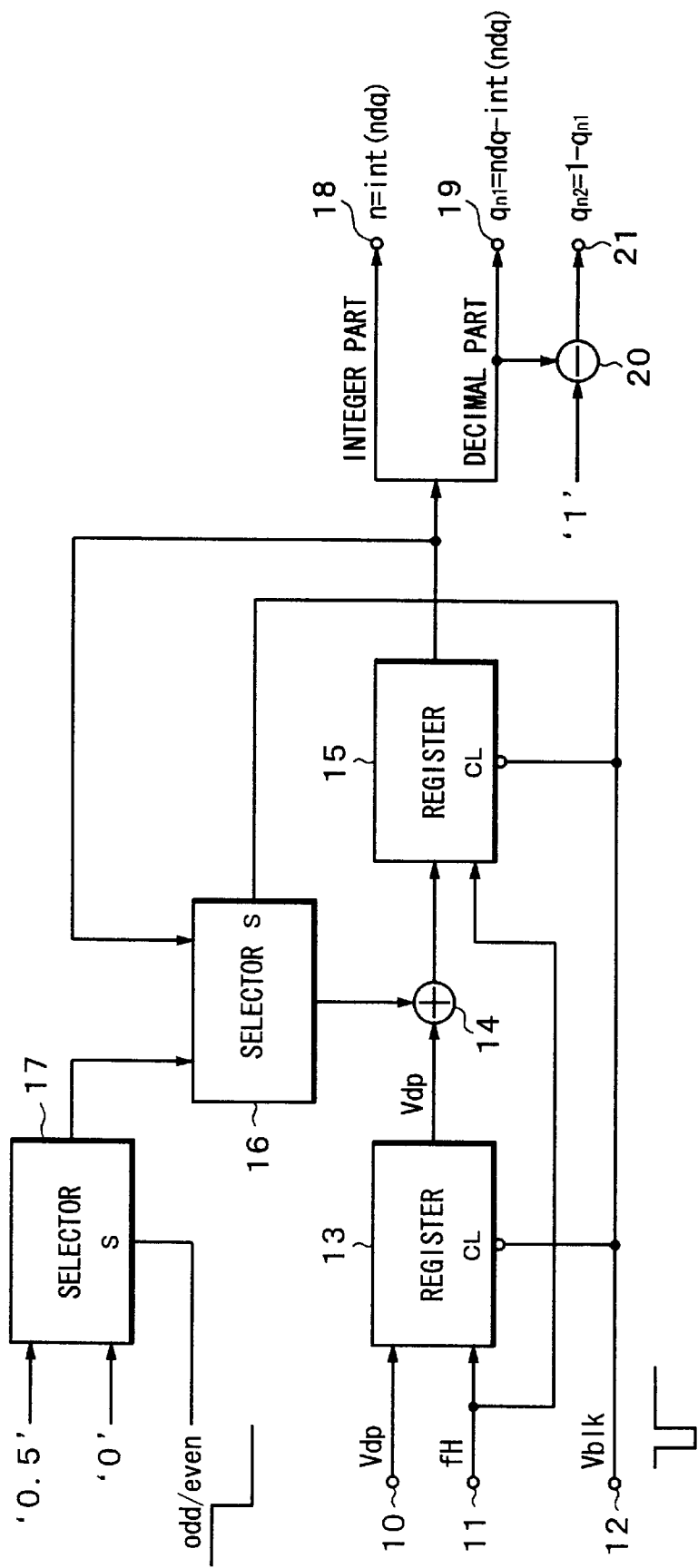
FIG. 4 is a block diagram showing an example of the structure of a vertical interpolating address/coefficient generator.

Next, with reference to the accompanying drawings, an embodiment of the present invention will be described. FIG. 1 shows an example of the structure of a picture processing apparatus according to the present invention. In this embodiment, an enlargement/reduction ratio has been designated to an input picture signal. A linear interpolation is performed with adjacent two lines. By properly selecting positions to be interpolated, the interlace relation is maintained and thereby the picture quality is improved.

The number of effective lines in one field of an original signal ($V_{active}$) and the number of effective lines of which the original signal is converted ($V_{size}$) are supplied to a divider 1. These values are supplied from a system controller (not shown) corresponding to a user's setup value or a system's setup value. When the number of effective lines in the 525 lines/50 Hz system is 240, the picture is enlarged 4/3 times and the number of lines is increased to 320 lines, $V_{active}$ becomes 240 and $V_{size}$ becomes 320 lines. In the divider 1, the vertical interpolation interval $V_{dp}$ is obtained by $V_{active}/V_{size}$. The vertical interpolation interval $V_{dp}$ is supplied to a vertical interpolating address/coefficient generator 2.

Corresponding to an input picture signal, a vertical blanking pulse $V_{blk}$ that represents the vertical blanking interval of the picture signal and a line clock $f_H$ generated every $1_H$ are extracted by a predetermined means (not shown). The vertical blanking pulse $V_{blk}$ and the line clock $f_H$ are supplied to a vertical interpolating address/coefficient generator 2.

The vertical interpolating address/coefficient generator 2 generates an interpolation vertical address n and a vertical interpolating coefficient $q_{n1}$ corresponding to the received vertical interpolation interval $V_{dp}$, the vertical blanking pulse $V_{blk}$, and the line clock $f_H$. In addition, $q_{n2}$ that is a 1's complement of $q_{n1}$ is generated. The process of the vertical address/coefficient generator 2 will be described later.

As described above, according to the embodiment of the present invention, the picture is enlarged/reduced by the linear interpolating process. As shown in FIG. 2, the position of a pixel $x_n$ in the coordinates after the enlargement is obtained corresponding to pixel $A_n$ and $A_{n+1}$ in the coordinates before the enlargement. Corresponding to the ratio of internally divided points of the pixels $A_n$ and $A_{n+1}$ to the pixel $x_n$, the data of the pixel $x_n$ is obtained corresponding to Formula (1). As the ratio of internally divided points, the vertical interpolating coefficient $q_{n1}$ and the 1's complement $q_{n2}$ are used.

$$x_n = q_{n2} \cdot A_n + q_{n-1} \cdot A_{n-1} \qquad (1)$$

Line data $A_t$ is successively supplied to a terminal 3 of FIG. 1 corresponding to the scanning of the picture signal. The data $A_t$ is composed of pixel data such as a luminance signal Y, a color difference signal U/V, or an RGB signal. If necessary, the line data $A_t$ is filtered in a preceding stage (not shown).

The line data $A_t$ is written to field memories 4 and 5 that are accessed line by line. The line addresses of the memories 4 and 5 deviate by one line. FIGS. 3A and 3B show examples of address mapping of the memories 4 and 5. In FIGS. 3A and 3B, there are addresses for N−1 lines in the vertical direction corresponding to the number of effective lines N in one field. The number of effective lines in one field (N) depends on the standard of the video signal. For example, in the case of the 525 line/60 Hz system, the number of effective line in one field is 240 lines. In the case of the 625 line/50 Hz system, the number of effective lines in one field is 288 lines.

In this example, line data from line 1 to line (N−1) is written to the field memory 5 shown in FIG. 3A. Line data from line 2 to line N is written to the field memory 4 shown in FIG. 3B. In other words, with respect to the same line address n, while the line $A_n$ is written to the field memory 5, whereas the line An−1 is written to the field memory 4.

The line data is read from the same address of the field memories 4 and 5 corresponding to the vertical interpolating address n that is output from the above-described vertical interpolating address/coefficient generator 2. The line data read from the field memory 4 is supplied to a first input terminal of a multiplier 6a of a sum-of-product calculator 6 composed of multipliers 6a and 6b and an adder 6c. The line data read from the field memory 5 is supplied to a first input terminal of the multiplier 6b.

The interpolating coefficient $q_{n1}$ is supplied to a second input terminal of the multiplier 6a. The interpolating coefficient $q_{n2}$ is supplied to a second input terminal of the multiplier 6b. In the multipliers 6a and 6b, the interpolating coefficients and the line data are multiplied. The multiplied results are supplied to the first and the second input terminals of the adder 6c. The added result of the adder 6c is the calculated result of the sum-of-product calculator 6c. Thus, the sum-of-product calculator 6 calculates the above-described Formula (1) and obtains the line data $x_n$.

Next, the vertical interpolating address/coefficient generator 2 in the above-described structure will be described. In the embodiment, the generator 2 properly selects the interpolation position of a line. FIG. 4 shows an example of the structure of the vertical interpolating address/coefficient generator 2. The vertical interpolation interval $V_{dp}$ is supplied to a terminal 10. The line clock $f_H$ and the vertical blanking pulse $V_{blk}$ are supplied to terminals 11 and 12, respectively. The clock $f_H$ is an operation clock for registers 13 and 15 that will be described later. The vertical blanking pulse $V_{blk}$ is supplied to the registers 13 and 15 and a selector 16 that will be described later.

The vertical interpolation interval $V_{dp}$ supplied to the terminal 10 is stored in the register 13. The vertical interpolation interval $V_{dp}$ is supplied to the register 15 through the adder 14. The vertical interpolation interval $V_{dp}$ is delayed by the register 15 for one clock $f_H$. The resultant vertical interpolation interval $V_{dp}$ is supplied to a second input terminal of the adder 14 through the selector 16. In other words, the vertical interpolation interval $V_{dp}$ is cumulated by the adder 14.

On the other hand, an odd/even signal for determining the odd/even field of the input video signal is supplied to a selector 17. The odd/even signal is in "H" level when the input video signal is in the odd field. The odd/even signal is in "L" level when the input video signal is in the even field. In addition, a first value corresponding to the scanning start point in the even field and a second value corresponding to the scanning start point in the odd field are supplied to the selector 17. The first value and the second value are [0.5] and [0] corresponding to 1 H that represents one horizontal interval, respectively. Corresponding to the odd/even signal, when the input video signal is in the odd field, the first value is selected and output. When the input video signal is in the even field, the second value is selected and output. The output data is supplied to the selector 16.

In the selector 16, the output data of the selector 17 is selected as input data in a vertical blanking interval. Thus, the initial value of the register 15 is designated as the first value or the second value corresponding to the odd/even signal. In addition, the vertical interpolation interval $V_{dp}$ is initialized every vertical blanking interval. In other words, the first value or second value selected by the selector 17 corresponding to the odd/even signal is an offset value corresponding to the vertical interpolation interval $V_{dp}$. With the first value or the second value, the initializing process is performed. Thus, when the first value is [0.5] and the second value is [0], the output data of each line in the odd field and even field of the register 15 in the effective line interval is as follows.

Odd field: 0.5, 0.5+dp, 0.5+2dp, 5+(N−1)dp
Even field: 0, dp, 2dp, . . . , (N−1)dp The integer part of the output data of the register 15 is supplied as a vertical interpolation address n to a terminal 18. On the other hand, the decimal part of the output signal of the register 15 is supplied as a vertical interpolating coefficient $q_{n1}$ to a terminal 19. The decimal part, vertical interpolating coefficient $q_{n1}$, is subtracted from 1 by a subtracter 20. The resultant data is supplied as a coefficient $q_{n2}$ to a terminal 21.

Thus, according to the present invention, predetermined offsets are added to the vertical interpolation interval $V_{dp}$ corresponding to the odd field and even field. Consequently, the start position of the interpolating process is shifted by the predetermined offsets. Next, with reference to FIGS. 5 and 6, the interpolating process according to the present invention will be conceptually described.

Figures 5A, 5B, 5C:
FIGS. 5A to 5C are schematic diagrams for explaining a conversion for increasing the number of lines two times.

FIGS. 5A to 5C show examples of which the number of lines of an interlace signal is converted and increased twice per field and thereby the picture is enlarged two times. In this case, the interpolation interval is ½ the line interval in one field. As shown in FIG. 5A, pixels in the odd field are written to the field memories 4 and 5. In this example, in the odd field, [0.5] has been selected as an offset value by the selector 17. Thus, as shown with the left portion of FIG. 5B, the first interpolation position is shifted for 0.5 H. On the other hand, in the even field, since [0] has been selected as an offset value, as shown with the right portion of FIG. 5B, the interpolating process is started from the first line.

FIG. 5C shows an example of the interpolated result. In both the odd field and even field, a pixel that is generated at the first interpolation position is the first line. In the odd field, the first line is output by interpolating "X" and "X". The second line is output as "X". The third line is output by interpolating ½ "X" and ½ "O". The fourth line is output as "O". And so on. Thus, the interpolated result as shown in FIG. 5C is obtained. Likewise, in the even field, the first line is output as "X". The second line is output by interpolating ½ "X" and ½ "O". And so on. Consequently, the interpolated result as shown in FIG. 5C is obtained.

Thus, a picture of one frame composed of the odd field and even field, a picture similar to the original picture shown in FIG. 5A is obtained.

Next, FIGS. 6A to 6C show examples of which the enlargement ratio is not an integer value, for example, the original picture is enlarged ⁴⁄₃ times. In this case, the interpolation interval is ⁴⁄₃ times the line interval of one field. In this example, as shown in FIG. 6B, the interpolating start position in the odd field deviates from the interpolating start position in the even field by 0.5 H.

In the odd field, the first line is output by interpolating "X" and "X". The second line is output by interpolating that "X" and "O" are in the ratio of ¾: ¼. The third line is output as "O". And so on. An interpolated line of which "X" and "O" are in the ratio of ¾: ¼ is in gray close to black. Thus, the interpolated result as shown in FIG. 6C is obtained. On the other hand, in the even field, the first line is output as "X". The second line is output by interpolating that "X" and "O" are in the ratio of ¾: ¼. The third line is output by interpolating "O" and "O". Thus, the interpolated result as shown with the right portion in FIG. 6C is obtained.

Thus, with a picture of one frame composed of the odd field and even field as shown in FIG. 6C, the same picture as the original picture is obtained as shown in FIG. 6A. Thus, a distortion does not take place unlike with the related art reference shown in FIG. 9C. Thus, according to the present invention, even if the line number converting process whose enlargement ratio is not an integer is performed, the interlace accuracy can be kept.

In the above-described embodiment, the linear interpolating process for vertical two lines was described. However, it should be noted that the present invention is not limited to such a process. Instead, the present invention can be applied to an interpolating process with many lines other than two lines.

As described above, according to the present invention, when the number of lines is converted with a field memory of which a signal with the interlace accuracy is accessed line by line, since the interpolating start position of the odd field is offset by 0.5 H against the even field. Thus, even if the conversion ratio is not an integer value, the optimum interlace relation is obtained.

Thus, according to the present invention, when a picture is enlarged, even if the line number converting process whose conversion ratio is not an integer value is performed, the resolution of the picture can be prevented from deteriorating and the lines from flickering.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A picture processing apparatus for interpolating an interlaced video signal having an odd field and an even field, comprising:

memory means having a first memory and a second memory for storing signals corresponding to two adjacent scanning lines from one field of said interlaced video signal in the same address of the first and second memories, respectively;

reading means for reading the stored signals corresponding to two adjacent scanning lines of the same field from said memory means at the same time; said reading means comprising:

generating means for generating an initial value that depends on whether the stored signals correspond to the odd field or the even field;

cumulating means for calculating an interpolating address by cumulating the inverse of an enlargement ratio and the generated initial value; and address changing means for changing a read start address of said memory means based on the cumulated interpolating address; and interpolating means for interpolating the signals read from said memory means by said reading means; said interpolating means enlarging the signals stored in said memory means.

2. The picture processing apparatus as set forth in claim 1, wherein said reading means further comprises:
        means for supplying an integer part of said interpolating address of said cumulating means as a read address to the first and second memory.

3. The picture processing apparatus as set forth in claim 2, wherein said interpolating means multiplies by an interpolation factor the two signals that have been read, adds the resultant signals, and outputs the added signal.

4. The picture processing apparatus as set forth in claim 3, wherein said reading means further comprises:
        means for supplying a decimal part of the output data of said cumulating means as the interpolation factor to said interpolating means.

5. A picture processing method for interpolating an interlaced video signal having an odd field and an even field, comprising the steps of:

storing said interlaced video signal to a memory that is divided into a first memory and a second memory; wherein signals corresponding to two adjacent scanning lines of the field are stored in the same address of the first and second memory, respectively;

reading the stored signals corresponding to two adjacent scanning lines of the same field from said memory means at the same time; said reading step further comprising the steps of:

generating an initial value that depends on whether the stored signals correspond to the odd field or the even field;

calculating an interpolating address by cumulating the inverse of an enlargement ratio and the generated initial value; and changing a read start address depending on an integer part of the cumulated interpolating address; and interpolating the two read signals such that the interpolated signals are enlarged over the signals stored in said memory means.

6. The picture processing method as set forth in claim 5, wherein the interpolating step is performed by multiplying by an interpolation factor the two signals that have been read, adding the resultant signals, and outputting the added signal.

7. The picture processing method as set forth in claim 6, wherein the interpolation factor is a decimal part of the cumulated result.

* * * * *